(12) United States Patent
Kang et al.

(10) Patent No.: US 10,205,149 B2
(45) Date of Patent: Feb. 12, 2019

(54) MANUFACTURING METHOD OF POROUS MULTILAYERED POLYOLEFIN

(71) Applicant: SK Innovation Co., Ltd., Seoul (KR)

(72) Inventors: Gwigwon Kang, Daejeon (KR); Dongjin Joo, Daejeon (KR); Yongkyoung Kim, Daejeon (KR); Jaewoong Kim, Daejeon (KR); Hyungmin Kim, Daejeon (KR); Jungmoon Sung, Daejeon (KR); Youngjun Woo, Daejeon (KR); Jang-weon Rhee, Daejeon (KR); Inhwa Jung, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/812,389

(22) Filed: Jul. 29, 2015

(65) Prior Publication Data

US 2016/0030974 A1   Feb. 4, 2016

(30) Foreign Application Priority Data

Jul. 30, 2014  (KR) ........................ 10-2014-0097355

(51) Int. Cl.
| | | |
|---|---|---|
| *B05D 3/12* | (2006.01) | |
| *H01M 2/16* | (2006.01) | |
| *H01M 2/14* | (2006.01) | |
| *B01D 67/00* | (2006.01) | |
| *B01D 69/12* | (2006.01) | |
| *B01D 71/26* | (2006.01) | |
| *C08J 5/18* | (2006.01) | |
| *C08J 7/04* | (2006.01) | |
| *H01M 10/0525* | (2010.01) | |

(52) U.S. Cl.
CPC ...... *H01M 2/1686* (2013.01); *B01D 67/0027* (2013.01); *B01D 67/0083* (2013.01); *B01D 67/0088* (2013.01); *B01D 69/12* (2013.01); *B01D 71/26* (2013.01); *C08J 5/18* (2013.01); *C08J 7/047* (2013.01); *H01M 2/145* (2013.01); *H01M 2/1653* (2013.01); *B01D 2323/44* (2013.01); *C08J 2323/06* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2006/0055075 A1* | 3/2006 | Hoshida | ............. | B01D 67/0027 264/154 |
| 2009/0098450 A1* | 4/2009 | Kikuchi | ................. | B32B 27/32 429/145 |
| 2009/0169862 A1* | 7/2009 | Rhee | ....................... | B32B 27/32 428/315.7 |
| 2010/0040948 A1* | 2/2010 | Takano | ................... | H01M 4/13 429/209 |

FOREIGN PATENT DOCUMENTS

JP   11322989 A   11/1999

* cited by examiner

*Primary Examiner* — Nathan T Leong
(74) *Attorney, Agent, or Firm* — The Webb Law Firm

(57) ABSTRACT

Provided is a manufacturing method of a polyolefin-based multilayer composite porous film, including: a) forming a composition including a polyolefin resin and diluent to a sheet; b) stretching the sheet and extracting the diluent to manufacture a film; c) performing heat-treatment on the manufactured film; and d) coating one surface or both surfaces of the heat-treated film with a coating solution containing a heat resistant resin, wherein step c) and step d) are continuously performed.

10 Claims, No Drawings

MANUFACTURING METHOD OF POROUS MULTILAYERED POLYOLEFIN

CROSS-REFERENCE TO RELATED APPLICATION

This application claims priority to Korean Patent Application No. 10-2014-0097355 filed Jul. 30, 2014, the disclosure of which is hereby incorporated in its entirety by reference.

TECHNICAL FIELD

The following disclosure relates to a manufacturing method of a polyolefin-based multilayer composite porous film. More specifically, the following disclosure relates to a manufacturing method of a polyolefin-based multilayer composite porous film capable of implementing excellent strength and permeability that is usable as a battery separator.

BACKGROUND

The existing polyolefin microporous film has been widely used as various battery separators, filters for separation, separator (film) for microfiltration, and the like, due to chemical stability and excellent mechanical properties. Among them, a porous film for a secondary battery requires high level of quality together with a need for stability of a battery. Recently, in accordance with the trend of high capacity and high output of the secondary battery, the need for improving properties of a porous film such as high strength, high permeability, heat stability of the porous film, and electrical stability of the secondary battery at the time of charging and discharging has further increased.

A lithium secondary battery requires high mechanical strength and heat stability to improve stability at a process of manufacturing a battery and during the usage, and high permeability in order to improve capacity and output. For example, when heat stability of the porous film is deteriorated, damage due to an increase in temperature in the battery may occur or short-circuit between electrodes may occur due to deformation, thereby causing overheat of the battery or increasing fire risk. In addition, as the utilization range of the secondary battery is expanded to automobiles for hybrid, it is important to secure stability of the battery in respect to overcharging, such that the porous film is required to have a property to withstand electrical pressure in respect to overcharge.

High strength is required to prevent loss of porous film that may occur in a process of manufacturing a battery or that may occur due to dendrites, and the like, produced in electrodes during a process of charging and discharging the battery to thereby prevent a short-circuit between the electrodes. In addition, when the strength of the porous film is weak at a high temperature, a short-circuit due to a film fracture may occur. After that, heat generation/ignition/explosion, and the like, due to a short-circuit between the electrodes occur. High strength may mean puncture strength in the present disclosure.

High permeability is required to improve capacity and output of a lithium secondary battery. In accordance with the trend requiring high capacity and high output of the lithium secondary battery, the need for a porous film having high permeability has increased.

Heat stability of the battery is affected by a shut down temperature, a melt down temperature, heat shrinkage, and the like, of the porous film. Among them, heat shrinkage at a high temperature has a significant influence on heat stability of the battery. In the case in which heat shrinkage is large, when an inner portion of the battery is at a high temperature, a portion of the electrode is exposed in a shrinkage process, which causes a short-circuit between the electrodes, and accordingly, heat generation/ignition/explosion, and the like, occur. Even though the melt down temperature of the porous film is high, when the heat shrinkage is large, a portion of the electrode may be exposed in a process of raising a temperature on the porous film, which may cause a short-circuit between the electrodes.

Japanese Patent Laid-Open Publication No. 1999-322989 (Patent Document 1) discloses a method of reducing shrinkage of a porous film. This method includes stretching a film in a machine direction only or reducing a total stretching ratio in order to reduce heat shrinkage in a transverse direction, such that an effect of improving physical properties obtained by the stretching process may not be obtained, such that the porous film manufactured by the method does not have excellent physical properties. In addition, products manufactured accordingly have significantly low puncture strength of about 0.06~0.11N/μm at room temperature, such that it is difficult to improve stability of the battery.

As described above, in the existing porous film, high strength, high permeability, and low heat shrinkage required for improving stability of a high capacity/high output secondary battery may not be implemented, and at the time of manufacturing a multilayer composite porous film by applying a heat resistant resin and/or inorganic particles in order to improve heat shrinkage property, there are problems in that productivity is significantly deteriorated and cost considerably increases.

RELATED ART DOCUMENT (Patent Document 1) Japanese Patent Laid-Open Publication No. JP 1999-322989 (Nov. 26, 1999)

SUMMARY

An embodiment of the present disclosure is directed to providing a manufacturing method of a polyolefin-based multilayer composite porous film, capable of having high strength, permeability, and low heat shrinkage, and excellent productivity to improve stability of a lithium secondary battery.

In one general aspect, a manufacturing method of a polyolefin-based multilayer composite porous film, includes:

a) forming a composition including a polyolefin resin and diluent to a sheet;

b) stretching the sheet and extracting the diluent to manufacture a film;

c) performing heat-treatment on the manufactured film; and d) coating one surface or both surfaces of the heat-treated film with a coating solution containing a heat resistant resin, wherein step c) and step d) are continuously performed.

The heat-treatment in step c) may include heat-setting, and include a heat-stretching process or a heat-relaxing process of the film in at least one direction.

In the heat-relaxing process, a width of the film after the heat-relaxing process may be reduced by a ratio of 50 to 99% as compared to a width of the film before the heat-relaxing process.

In step b), an stretching ratio may be four times or more in a machine direction and a transverse direction, respectively, and a total stretching ratio may be 20 to 80 times, and in step c), a heat stretching ratio may be 1.01 to 2.0 times in a machine direction or a transverse direction.

The composition of step a) may include 15 to 50 wt % of the polyolefin resin and 85 to 50 wt % of the diluent.

The polyolefin resin of step a) may have a weight average molecular weight of $1 \times 10^5 \sim 2 \times 10^6$ g/mol.

The manufacturing method may further include: e) drying the film coated in step d), wherein the drying is performed by using air or an infrared drying device.

The heat-stretching process of step b) may be performed within a range between a temperature lower than a melting point of the polyolefin resin by 40° C. and the melting point of the polyolefin resin, and the heat-treatment process of step d) may be performed within a range between a temperature lower than the melting point of the polyolefin resin by 30° C. and a temperature higher than the melting point of the polyolefin resin by 10° C.

The heat resistant resin in step d) may include a water-soluble polymer or a water-insoluble polymer in which a melting point or a glass transition temperature is 150° C. or more.

The water-soluble polymer may be at least any one selected from the group consisting of polyvinyl alcohol, polyacrylamide, polyvinylpyrrolidone, carboxyl methyl cellulose, hydroxyethyl cellulose, maleic anhydride-based resin, dextrin and mixtures thereof, and the water-insoluble polymer may be a mixture including any one or two or more selected from polypolyphenylene sulfone, polysulfone, polyimide, polyamideimide, polyarylamide, polyarylate, polycarbonate, polyvinylidene fluoride, and copolymers thereof, or may include an acrylate group in which a glass transition temperature is −60° C. to 0° C.

DETAILED DESCRIPTION OF EMBODIMENTS

Hereinafter, a manufacturing method of a polyolefin-based multilayer composite porous film according to the present disclosure is described in more detail. The exemplary embodiments of the present disclosure to be described below are provided by way of example so that the idea of the present disclosure can be sufficiently transferred to those skilled in the art to which the present disclosure pertains. Here, unless technical and scientific terms used herein are defined otherwise, they have meanings understood by those skilled in the art to which the present disclosure pertains.

The present inventors of the present disclosure found that a constitution including a heat-stretching process, a heat-relaxing process, or a heat-setting process and controlling the processes in combination may be used in manufacturing a polyolefin-based multilayer composite porous film, such that excellent mechanical strength and permeability, and low heat shrinkage may be implemented, processes of winding, unwinding or rewinding the base polyolefin porous film for manufacturing the multilayer composite porous film may not be separately required, and deformation of the porous film may be minimized to overcome deterioration of productivity due to defects, and completed the present disclosure.

The present disclosure provides a manufacturing method of a polyolefin-based multilayer composite porous film, including: a) forming a composition including a polyolefin resin and diluent to a sheet; b) stretching the sheet and extracting the diluent to manufacture a film; c) performing heat-treatment on the manufactured film; and d) coating one surface or both surfaces of the heat-treated film with a coating solution containing a heat resistant resin, wherein step c) and step d) are continuously performed.

Hereinafter, each step according to the present disclosure will be described in detail.

Step a) is a process of forming a composition including a polyolefin resin and diluent to a sheet. The polyolefin-based resin may be at least one polyolefin-based resin alone or a mixed component including at least one polyolefin-based resin and inorganic materials or other resins except for the polyolefin-based resin.

The polyolefin-based resin may include at least one polyolefin-based resin selected from monomers such as ethylene, propylene, α-olefin, 4-methyl-1-pentene, and the like and comonomers such as polyethylene, polypropylene and poly-4-methyl-1-pentene, and the like, but the present disclosure is not limited thereto. That is, the polyolefin-based resin may be used alone or as a copolymer thereof or a mixture thereof.

In the present disclosure, as one preferable example of the polyolefin-based resin in view of strength, extrusion compoundability, elongation property, and heat resistant property of the final porous film, and the like, high density polyethylene in which a content of a comonomer is less than 2%, or a mixture thereof may be used.

The polyolefin-based resin may have a weight average molecular weight of $1 \times 10^5 \sim 2 \times 10^6$ g/mol, and more preferably, $2 \times 10^5 \sim 1 \times 10^6$ g/mol. When the weight average molecular weight is less than $1 \times 10^5$ g/mol, strength of the porous film may be deteriorated, and when the weight average molecular weight is more than $2 \times 10^6$ g/mol, extrusion compoundability and elongation property may be poor, such that the porous film may have deteriorated appearance and uniformity and it is difficult to implement high permeability.

In addition, the resin composition may further include additive components for improving heat resistance and permeability including inorganic materials or polyolefin in order to improve heat resistance performance and permeability of the porous film, wherein when the additional component is a resin, the resin may be used without limitation as long as it is a resin for improving heat resistance and permeability. Here, a content of the additional component is 20 wt % or less in the composition, preferably, 0.1 to 20 wt % to improve mechanical strength of the porous film. Examples of the inorganic material may include calcium carbonate, silica, barium sulfate, talc, mixtures thereof, and the like, but the present disclosure is not necessarily limited thereto.

The resin for improving heat resistance and permeability is a different kind of resin from polyolefin. Examples of the resin may include at least any one selected from polyamide resin (nylon-based resin), polybutylene terephthalate (PBT), polyethylene terephthalate (PET), poly chlorotrifluoroethylene (PCTFE), polyoxymethylene (POM), polyvinyl fluoride (PVF), polyvinylidene fluoride (PVdF) polycarbonate, polyarylate, polysulfone, polyether imide, and mixtures thereof, but the present disclosure is not necessarily limited thereto.

Further, if necessary, when the resin composition may further include general additives for improving specific functions such as oxidation stabilizer, UV stabilizer, antistatic agent, and the like, within the range at which properties of the porous film are not significantly deteriorated.

In the present disclosure, an organic compound forming a single-phase with the polyolefin-based resin used in the resin composition at an extrusion temperature may be used as the diluent without limitation. Preferable examples of the diluent may include aliphatic or cyclic hydrocarbons such as nonane, decane, decalin, paraffin oil, paraffin wax, and the like, phthalic acid esters such as dibutyl phthalate, dioctyl phthalate, and the like, C10-C20 fatty acids such as palmitic acid, stearic acid, oleic acid, linoleic acid, linolenic acid, and the like, and C10-C20 fatty alcohols such as palmitic alcohol, stearic alcohol, oleic alcohol, and the like, and mixtures thereof. The diluent is harmless to a human body, has a high boiling point, and a less volatile component. The diluent may be preferably paraffin oil, more preferably, paraffin oil in which kinetic viscosity at 40° C. is 20 cSt to 200 cSt. When the kinetic viscosity of the paraffin oil is more than 200 cSt, the kinetic viscosity in an extrusion process is high which causes problems such as an increase in load, surface defects of a sheet and a film, and the like, and it is difficult to perform extraction in an extraction process, such that productivity may be deteriorated, and permeability may be decreased due to residual oil. When the kinetic viscosity of the paraffin oil is less than 20 cSt, it is difficult to perform kneading during the extrusion process due to a difference in viscosity with molten polyethylene in an extruder.

In the sheet composition including the polyolefin resin and the diluent in the present disclosure, a mixing ratio between the polyolefin-based resin and the diluent in melting/kneading/extruding processes may be a weight ratio of 15~50:85~50, preferably. When a ratio of the polyolefin-based resin is less than 15 weight ratio, it is not easy to form a uniform sheet due to an excessive amount of diluent with low viscosity, and sufficient orientation is not achieved in the stretching process, such that it is not easy to secure mechanical strength, and a sheet to be manufactured is weak, which may cause problems such as fractures, and the like, in the stretching process. In addition, when the ratio of the polyolefin-based resin is more than 50 weight ratio, extrusion formability is deteriorated due to an increase in extrusion load, and permeability of the porous film is largely reduced, and the sheet is strong, such that non-uniform stretching may occur.

That sheet composition is subjected to a melting process/a kneading process by using a twin-screw compounder, a kneader, a Banbury mixer, and the like, designed to knead the polyolefin-based resin and the diluent to thereby obtain a single-phase mixture. Here, it is appropriate that an extrusion temperature is a temperature (30° C. or higher as compared to a melting temperature of a resin) in which the resin is present in a single phase with the diluent while being in a complete liquid state. The extrusion temperature is preferably 160~300° C., more preferably, 180~250° C. The mixture is extruded and cooled by T-die to be formed into a sheet form, and formed to be a solid phase sheet by water-cooled or air-cooled casting or calendaring method. The polyolefin and the diluent may be subjected to pre-blending, and injected into a compounder, or may be injected from separated feeders, respectively.

Next, step b) a process of stretching the sheet and extracting the diluent is performed.

The sheet manufactured by the process a) is stretched by roll type or tenter type of sequential stretching or simultaneous stretching, wherein the stretching process is performed by applying heat, an stretching ratio is 4 times or more in machine direction and transverse direction, respectively, and a total stretching ratio is 20 to 80 times. When the stretching ratio in one side direction is less than 4 times, orientation of polyolefin in the porous film is not sufficient, such that high strength may not be secured. In addition, when total stretching ratio is less than 20 times, non-stretching may occur and physical properties may not be good, and when total stretching ratio is more than 80 times, a possibility that fractures occurs during stretching may be high and shrinkage of the final film may be increased. It is appropriate that a temperature for performing the stretching is a temperature between [a melting temperature of a polyolefin-based resin–40° C.]~[a melting temperature of a polyolefin-based resin]. When the polyolefin-based resin is a mixture rather than one kind, a melting temperature of a resin having the largest content is determined as a melting point of the polyolefin-based resin.

At a temperature less than [a melting temperature of a polyolefin-based resin–40° C.], flexibility of polymer chains in the polyolefin-based resin is not secured, and non-uniform stretching, fractures, and the like, may occur in the stretching process, such that elongation stability may not be secured, and permeability of a final porous film may be reduced, whereby it is impossible to manufacture a high quality porous film. In addition, at a temperature more than [a melting temperature of a polyolefin-based resin], sufficient tension is not applied to a film due to excessive heat, such that over-elongation may partially occur, such that uniformity in product quality may not be secured, and orientation of the resin in the sheet is not sufficiently performed, whereby strength of the final porous film may be decreased, and it is difficult to manufacture a porous film for a battery with high stability. In general, the polyethylene resin is preferably stretched within a range between 100° C. to 140° C.

From the film stretched by the above-described step, diluent in the film is extracted and dried by using organic solvents. The organic solvents usable in the present disclosure are not specifically limited, but may be any solvent as long as it is capable of extracting the diluent used in extruding the resin. Preferably, the diluent may be methyl ethyl ketone, methylene chloride, hexane, and the like, that has high extraction efficiency and is rapidly dried.

As the extraction method, all of the general solution extracting methods such as an immersion method, a solvent spray method, an ultrasonic method, and the like, may be used respectively, or may be used in combination. In addition, a content of residual diluent at the time of performing the extracting method needs to be 2 wt % or less. When the residual diluent is more than 2 wt %, physical properties may be deteriorated, and permeability of the film may be reduced. An amount (an extraction rate) of the residual diluent significantly depends on an extraction temperature and an extraction time. It is preferable that the extraction temperature is high in order to increase solubility of the diluent and the solvent. However, in consideration of a stability problem regarding boiling of the solvent, the extraction temperature is preferably 40° C. or less. The extraction time may vary depending on a thickness of a film to be produced, but when a general microporous film having a thickness of 10-30 µm is produced, the extraction time may be preferably 2 to 4 minutes. The film in which the diluent is substituted with an organic solvent by the extraction process is subjected to a drying process to finally dry the organic solvent, thereby manufacturing a microporous film. In the extracting/drying process, shrinkage property and physical properties may be controlled by applying tension.

Next, step c) a heat-treatment process that is a step of performing heat-treatment on the film manufactured after step b) is performed.

The heat-treatment process of reducing shrinkage of a final film and changing a pore structure is performed by removing residual stress of the dried film. The heat-treatment process may be classified into a heat-stretching step, a heat-setting step, and a heat-relaxing step, and the like. The heat-stretching step is a step of performing stretching in either a machine direction (MD) or a transverse direction (TD), or both simultaneously, in a state in which heat is applied by using an apparatus such as a roll or a tenter to thereby expand pores through internal interface gap of the porous film, wherein the ratio is preferably 1.01 times to 2.0 times in machine direction and transverse direction, respectively. When an stretching ratio is more than 2.0 times, the porous film may be fractured in the stretching process due to excessive stretching, and pore size and shrinkage of the porous film may be excessively increased. The heat-setting step is a step of applying heat in a state in which film is forcibly fixed by an apparatus such as a roll or a tenter so as not to generate dimensional change in length and width directions, to thereby remove residual stress in the film. The heat-relaxing step is a step of reducing a size in either of machine direction or transverse direction or in both simultaneously from 99% up to 50% ([length/width after heat-relaxing step]÷[length/width before heat-relaxing step]) as compared to length/width before the heat-relaxing step in length and width directions, in a state in which heat is applied by an apparatus such as a roll or a tenter, to thereby reduce residual stress and shrinkage. In order to sufficiently reduce shrinkage, contraction (relaxation) needs to be performed so as to satisfy 99% or less, and when the contraction (relaxation) is performed at less than 50%, low shrinkage may be implemented, but permeability may be excessively reduced. In the heat-treatment process, the heat-stretching, heat-setting, and heat-relaxing steps may be selectively or multiply repeated. The heat-treatment process needs to be performed at a temperature between [a melting temperature of a polyolefin-based resin−30° C.] and [a melting temperature of a polyolefin-based resin+10° C.]. When the polyolefin-based resin is a mixture rather than one kind, a melting temperature of a resin having the largest content is determined as a melting point of the polyolefin-based resin. When the heat-treatment process is performed at a temperature less than [a melting temperature of a polyolefin-based resin−30° C.], the heat-stretching, heat-setting, and heat-relaxing are performed in a state in which flexibility of chains in the resin is not secured, such that removing stress in the resin is not sufficiently performed, whereby shrinkage may be increased, and in the heat-stretching step, film fracture, and the like, may occur, and pores may be excessively increased. When the heat-treatment process is performed at a temperature more than [a melting temperature of a polyolefin-based resin+10° C.], the chains in the resin may have sufficient flexibility to sufficiently perform stress relaxation, thereby reducing shrinkage. However, a pore structure is broken to excessively reduce permeability, such that it is not possible to manufacture the porous film with high permeability. In general, an appropriate heat-treatment temperature for high density polyethylene is 110° C.~140° C. In addition, when the heat-treatment temperature is high, time for the heat-treatment process may be reduced, and when the heat-treatment temperature is low, time for the heat-treatment process may be increased. Preferably, it is appropriate that the time for heat-treatment is 10 seconds to 2 minutes.

Next, step d) a process of coating one surface or both surfaces of the heat-treated film with a coating solution containing a heat resistant resin is performed.

In order to improve heat resistance for the porous film manufactured by the above-described step, a solution containing polymer and/or inorganic materials is applied on one surface or both surfaces of a substrate and the solvent is removed and dried under appropriate humidity, temperature, and a flow rate. Here, the heat resistant resin to be applied may be classified into a water-soluble polymer and a water-insoluble polymer depending on solubility to water. Examples of the water-soluble polymer resin may include polyvinyl alcohol, polyacrylamide, polyvinylpyrrolidone, carboxyl methyl cellulose, hydroxyethyl cellulose, dextrin, and the like, in which a melting temperature (Tm) or a glass transition temperature (Tg) or a carbonization temperature is 150° C. or more, but the present disclosure is not necessarily limited thereto. The water-insoluble polymer resin may be one or two or more mixtures selected from the group consisting of polypolyphenylsulfone, polysulfone, polyimide, polyamideimide, polyarylamide, polyarylate, polycarbonate, polyvinylidene fluoride and copolymers thereof, having a melting point (Tm) of 150° C. or more, but the present disclosure is not necessarily limited thereto. Here, when a heat resistant temperature of the polymer is 150° C. or less, the heat resistant temperature is near a melting temperature of a polyethylene porous film which is a base, and heat shrinkage property at a high temperature of 130~160° C. may not be improved.

In addition, in order to further provide heat resistant adhesion to the water-insoluble polymer, latex particles in an emulsion form that includes an acrylate group in which a glass transition temperature Tg is −60° C. to 0° C. may be selectively included. In this case, when Tg is −60° C. or less, gel may be largely generated in an emulsion state due to low Tg, such that at the time of coating the solution, an agglomeration phenomenon with inorganic particles may occur, and when Tg is 0° C. or more, adhesion between inorganic particles or adhesion between the inorganic particles and the substrate may be deteriorated to cause a desorption phenomenon of the inorganic particles of the coating layer.

A solvent used for a coating solution is not significantly limited, but preferably, is usable as long as it is capable of dissolving a heat resistant resin and dispersing inorganic particles. Examples of the solvent may include at least one tetrachloroethane, methylene chloride, chloroform, 1,1,2-trichloroehtane, tetrahydrofuran, 1,4-dioxane, chlorobenzene, cyclohexanone, dimethylformamide, acetone, dimethylsulfoxide, N-methyl-2-pyrrolidone, dimethylacetamide, water, alcohol, and the like, but the present disclosure is not limited thereto.

The inorganic particles used in the present disclosure may preferably have an average particle size of 0.3 to 2 μm in order to provide high permeability and stability. When the average particle size is less than 0.3 μm, a large amount of time is required for a process for dispersing particles, and porosity of a coating layer may be reduced, and a specific surface of the particles may be increased. Accordingly, a large amount of heat resistant resin is used in order to provide adhesion, which results in reduction of permeability of a total porous film. In addition, when an average particle size is more than 2 μm, it is difficult to achieve a thin coating layer, and packing of the inorganic particles is not sufficiently achieved, such that there is limitation in improving heat resistant property.

As the inorganic particles, calcium carbonate, alumina, aluminum hydroxide, silica, barium titanium oxide, magnesium oxide, magnesium hydroxide, talc, clay, titanium oxide, and the like, may be used alone or in combination. However, the present disclosure is not necessarily limited thereto.

A ratio between the heat resistant resin and the inorganic particles is not specifically limited in the present disclosure; however, the heat resistant resin and the inorganic particles are produced at a ratio of 20/80~2/98 (wt %). When the ratio between the heat resistant resin and the inorganic particles is less than 20/80, it is difficult to implement sufficient permeability, and when the ratio between the heat resistant resin and the inorganic particles is more than 2/98, adhesion may be remarkably deteriorated. A thickness of the coating layer may be preferably 1~6 μm. When the thickness of the coating layer is less than 1 μm, it is difficult to improve heat resistance by applying inorganic particles, and in addition, the inorganic particles may not sufficiently function as a spacer role with electrodes according to the usage of the inorganic particles. Meanwhile, when the thickness of the coating layer is more than 6 μm, since a coating thickness is high, adhesion of the coating layer may be deteriorated, and permeability may be remarkably reduced, such that it is difficult to design a battery which is appropriate for high output and high capacity.

General methods may be used as a method of applying a solution consisting of a heat resistant resin and inorganic particles. Examples of the method may include a bar coating method, a rod coating method, a die coating method, a wire coating method, a comma coating method, a micro gravure/gravure method, a dip coating method, a spray method, a spin coating method, and the like, and these methods may be mixed or modified to be used. Then, a process of removing a portion of a coating layer on a surface using a doctor blade, an air knife, or the like, may be included.

Additionally, e) drying the film coated in step d) may be further included.

The coating layer in a solution state coated on the substrate may be subjected to a step of removing a solvent used together by a drying process under a predetermined of temperature and a predetermined of humidity. Here, the drying process is not specifically limited, but may be performed by using air or apparatuses such as an infrared drying device, an ultrasonic drying device, and the like.

The processes in the manufacturing method of the polyolefin-based multilayer composite porous film according to the present disclosure as described above need to be performed in a continuous manner without interrupting the sheet and the film in order to secure excellent productivity. In particular, step c) and step d) may be continuously performed. Accordingly, excellent productivity may be secured by performing the processes in a continuous manner without performing winding, unwinding and rewinding processes, separately.

Hereinafter, the following Examples of the present disclosure will be described in more detail but the scope of the present disclosure is not limited thereto.

(Evaluation)

1. Molecular Weight

A molecular weight of a polyolefin resin was measured at 140° C. by high temperature gel permeation chromatography (GPC) from Polymer Laboratory Company using 1,2,4-trichlorobenzene (TCB) as a solvent, and a standard sample for measuring the molecular weight was polystyrene.

2. Analysis of Heat Property

A melting temperature Tm of the polyolefin-based resin was analyzed by differential scanning calorimetry (DSC) (Mettler Toledo Company, DSC-822E). Analysis for the polyolefin-based resin and the heat resistant resin was performed by raising a temperature until 5 mg of a sample of the resin as completely melted at a scanning rate of 10° C./min, and maintaining the temperature for 10 minutes so that the resin is completely melted, and reducing the temperature to be 0° C. at a scanning rate of 10° C./min so as to achieve crystallization as a complete solid state, and then raising the temperature again at a scanning rate of 10° C./min to thereby determine the melting temperature of the resin.

3. Film Thickness

Thickness of a final product was measured at a measurement pressure of 0.63N by TESA Mu-Hite Electronic Height Gauge manufactured from the TESA Company.

4. Puncture Strength

Strength of a porous film was measured by mounting a pin having a diameter of 1 mm and a radius of curvature of 0.5 mm to UTM (universal testing machine) from Instron Company, and breaking the porous film at a temperature of 23° C. and a moving speed of 120 mm/min. Values normalized by thickness were expressed by as N/μm.

5. Air Permeability

Air permeability was measured by porometer (PMI company, CFP-1500-AEL). In general, air permeability is expressed by a Gurley number. However, the Gurley number does not correct an effect of a thickness of the porous film, such that it is difficult to figure out relative permeability according to a pore structure of the porous film itself. To solve this problem, Darcy's permeability constant was used in the present disclosure. Darcy's permeability constant is obtained from the following Equation and nitrogen was used in the present disclosure.

$$C = (8F\,T\,V)/(\pi D^2(P^2-1))$$

wherein C: Darcy's permeability constant
F: flow rate
T: sample thickness
V: viscosity of gas (0.185 for N2)
D: sample diameter
P: pressure In the present disclosure, an average value of Darcy's permeability constant in 100~200 psi regions was used.

6. Shrinkage

A shrinkage was calculated by cutting a composite porous film to have a size of 10 cm×10 cm, placing the film between Teflon films, putting the stack of films between a glass sheet having a size of 11 cm×11 cm and a thickness of 3 mm, and putting the stack of glasses and films into an oven (JEIO TECH, OF-12GW) of which a temperature is stabilized at 150° C., and allowing the film to stand for 60 minutes, and then, measuring a size change. Calculation of the shrinkage was performed according to Equation 1 below:

shrinkage (%)=100×(100 mm−length after the film is allowed to stand at 150° C.)/100 mm  [Equation 1]

7. Productivity

A ratio between a production amount (m²/hr) for each unit time (1 hr) of a base porous film product after performing a heat-treatment process, and a production amount (m²/hr) of a composite porous film product manufactured by coating the porous film obtained after the heat-treatment process is finished, in continuous production for 20 hours or more, was used to measure productivity. Calculation of the productivity was performed according to Equation 2 below: For comparison under the same criteria, a production amount for each unit time (1 hr) of films obtained after heat-treatment process (base porous films before being coated) in each of the manufacturing method of the present disclosure and a non-continuous manufacturing method, was determined as a production amount of a base porous film. Specifically, loss due to replacement of roll to be wound, loss occurring in a non-continuous process, and the like, are included in the production amount of the base porous film, but are excluded from the production amount of the composite porous film.

Productivity (%)=(production amount of composite porous film(m²/hr))/(production amount of base porous film(m²/hr))×100  [Equation 2]

EXAMPLE 1

High-density polyethylene having a weight average molecular weight of $3.0\times10^5$, and a melting temperature of 135° C. was used as a polyolefin-based resin, and paraffin oil having a kinematic viscosity of 160 cSt at 40° C. was used as a diluent. Composition ratios of the polyolefin-based resin and the diluent were 28 wt % and 72 wt %.

The composition was extruded at 230° C. by a twin-screw compounder, and was formed to be a sheet by T-die and a casting roll. This sheet was subjected to sequential stretching at 112° C. in machine direction by 7.5 times, and at 126° C. in transverse direction by 6 times. The diluent was extracted from the stretched film by applying tension using methylene chloride of 25~30° C. The heat-treatment process was performed at 129° C. in transverse direction, and a heat-stretching step by 1.5 times, a heat-setting step, and a heat-relaxing step at 80% were sequentially performed. The base porous film manufactured as above had a width of 1000 mm.

The coating process was continuously performed on the base porous film manufactured by the above-described method.

The coating solution for the coating process included 45 wt % of $Al_2O_3$ powder (average particle size of 0.5 μm), 2.0 wt % of polyvinyl alcohol having a melting temperature of 220° C., 1.5 wt % of solid content of Acrylic latex having a glass transition temperature of −45° C., and 51.5 wt % of deionized water, and was previously prepared before the coating process.

The coating solution was applied to a surface of the above-manufactured base porous film at a coating width of 900 mm by a continuous process, and then the solvent was dried/removed at a section set at 110° C., to thereby finally manufacture a polyolefin-based composite porous film having a coating layer of a thickness of 5.0 um. Non-coated portions and both ends of the film were cut from the porous film to thereby obtain a final composite porous film. A width of the final composite porous film was 800 mm, a production speed thereof was 5 m/min, and rolls were replaced for each 500 m unit of the manufactured product. In a process of replacing a roll after being wound with a new roll, product loss of 20 m occurred. Table 1 below shows physical properties and productivities of the manufactured composite porous films.

EXAMPLE 2

High-density polyethylene having a weight average molecular weight of $3.8\times10^5$, and a melting temperature of 135° C. was used as a polyolefin-based resin, and paraffin oil having a kinematic viscosity of 160 cSt at 40° C. was used as a diluent. Composition ratios of the polyolefin-based resin and the diluent were 33 wt % and 67 wt %

The composition was extruded at 230° C. by a twin-screw compounder, and was formed to be a sheet by T-die and a casting roll. This sheet was subjected to sequential stretching at 115° C. in by 6.5 times, and at 127° C. in a transverse direction by 6.5 times. The diluent was extracted from the stretched film by applying tension using methylene chloride at 25~30° C. The heat-treatment process was performed at 131° C. in transverse direction, and a heat-stretching step by 1.6 times, a heat-setting step, and a heat-relaxing step at 78% were sequentially performed. The base porous film to be manufactured had a width of 1000 mm. The coating process was continuously performed on the base porous film manufactured by the above-described method.

The coating solution for the coating process included 46 wt % of $Al_2O_3$ powder (average particle size of 0.8 μm), 1.9 wt % of polyvinyl alcohol having a melting temperature of 220° C., 1.4 wt % of solid content of Acrylic latex having a glass transition temperature of −45° C., and 50.7 wt % of deionized water, and was previously prepared before the coating process.

The coating solution was applied to a surface of the above-manufactured base porous film at a coating width of 900 mm by a continuous process, and then the solvent was dried/removed at a section set at 110° C., to thereby finally manufacture a polyolefin-based composite porous film having a coating layer of a thickness of 5.0 um. Non-coated portions and both ends of the film were cut from the porous film to thereby obtain a final composite porous film. A width of the final composite porous film was 800 mm, a production speed thereof was 5 m/min, and rolls were replaced for each 500 m unit of the manufactured product. In a process of replacing a roll after being wound with a new roll, product loss of 20 m occurred. Table 1 below shows physical properties and productivities of the manufactured composite porous films.

COMPARATIVE EXAMPLE 1

High-density polyethylene having a weight average molecular weight of $1.5\times10^5$, and a melting temperature of 134° C. was extruded by a single screw extruder at 200° C., and was formed to a film by T-die and a casting roll. This film was subjected to cold-stretching process at room temperature by 1.5 times and heat-stretching process at 110° C. by 2.2 times, by a roll type stretching machine, and a heat-setting process at 120° C. to manufacture a base porous film with a dry process. The above-manufactured base porous film had a width of 500 mm, a production speed was 5 m/min, and rolls were replaced by 530 m unit so that a product after a coating process had a length of 500 m. In a process of replacing a roll after being wound with a new roll, product loss of 20 m occurred. The base porous film manufactured as above was transferred to a coating apparatus, and coated while being wound by a winding machine.

The coating solution for the coating process included 44.5 wt % of $Al_2O_3$ powder (average particle size of 0.5 μm), 2.1 wt % of polyvinyl alcohol having a melting temperature of 220° C., 1.3 wt % of solid content of Acrylic latex having a glass transition temperature of −45° C., and 52.1 wt % of deionized water, and was previously prepared before the coating process.

The coating solution was applied to a surface of the above-manufactured base porous film at a coating width of 450 mm by a continuous process, and then the solvent was dried/removed at a section set at 110° C., to thereby finally manufacture a polyolefin-based composite porous film having a coating layer of a thickness of 5.0 um. Non-coated portions and both ends of the film were cut from the porous film to thereby obtain a final composite porous film. A width of the final composite porous film was 400 mm, a production speed thereof was 5 m/min, and the manufactured product had a length of 500 m. The fraction of coating defect generated due to sags or wrinkles of the base porous film performed and wound for a total of 20 hours was confirmed as 18%. In the case of a product having a length of 500 m, when a defect occurs at one point, total length including the point at which the defect occurs was not usable. Table 1 below shows physical properties and productivities of the manufactured composite porous films.

COMPARATIVE EXAMPLE 2

High-density polyethylene having a weight average molecular weight of $3.0\times10^5$, and a melting temperature of 135° C. was used as a polyolefin-based resin, and paraffin oil having a kinematic viscosity of 160 cSt at 40° C. was used as a diluent. Composition ratios of the polyolefin-based resin and the diluent were 30 wt % and 70 wt %

The composition was extruded at 230° C. by a twin-screw compounder, and was formed to be a sheet by T-die and a casting roll. This sheet was subjected to sequential stretching at 116° C. in machine direction by 6 times, and at 124° C. in transverse direction by 5.5 times. The diluent was extracted from the stretched film by applying tension using methylene chloride of 25~30° C. The heat-treatment process was performed at 130° C. in transverse direction, and a heat-stretching step by 1.3 times, a heat-setting step, and a heat-relaxing step at 85% were sequentially performed. The base porous film to be manufactured had a width of 1000 mm. A production speed was 5 m/min, and rolls were replaced by 530 m unit so that a product after a coating process had a length of 500 m. In a process of replacing a roll after being wound with a new roll, product loss of 20 m occurred. The base porous film manufactured as above was transferred to a coating apparatus, and coated while being wound by a winding machine.

The coating solution for the coating process included 47 wt % of $Al_2O_3$ powder (average particle size of 0.5 μm), 1.8 wt % of polyvinyl alcohol having a melting temperature of 220° C., 1.7 wt % of solid content of Acrylic latex having a glass transition temperature of −45° C., and 49.5 wt % of deionized water, and was previously prepared before the coating process.

The coating solution was applied to a surface of the above-manufactured base porous film at a coating width of 900 mm by a continuous process, and then the solvent was dried/removed at a section set at 110° C., to thereby finally manufacture a polyolefin-based composite porous film having a coating layer of a thickness of 5.0 um. Non-coated portions and both ends of the film were cut from the porous film to thereby obtain a final composite porous film. A width of the final composite porous film was 800 mm, a production speed thereof was 5 m/min, and the manufactured product had a length of 500 m. The fraction of coating defect generated due to sags or wrinkles of the base porous film performed and wound for a total of 20 hours was confirmed as 12%. In the case of a product having a length of 500 m, when a defect occurs at one point, total length including the point at which the defect occurs was not usable. Table 1 below shows physical properties and productivities of the manufactured composite porous films.

The polyolefin-based multilayer composite porous film according to the present disclosure may implement excellent mechanical strength, permeability, and low heat shrinkage.

In addition, in the manufacturing method of a polyolefin-based multilayer composite porous film of the present disclosure, the base porous film for manufacturing the porous film may be manufactured without separately performing winding, unwinding or rewinding process, and may be continuously coated to minimize loss of the porous film that may occur during the process, and to minimize coating defects due to porous film deformation occurring at the time of winding the base porous film, thereby improving productivity to provide economic benefits.

Specifically, the base porous film has unevenness of film thickness, and when the base porous film is wound for a predetermined length or more, as a winding process proceeds, the wound portion in a relatively thick part has a larger thickness which causes deformation on the additionally wound film, and the deformed base porous film incurs sags or wrinkles at the time of being wound for coating, which causes defects in the coating process and deteriorates productivity. In addition, at the time of mounting the wound-base porous film onto a coating apparatus to thereby produce a coated composite porous film, loss of porous film occurs by lengths at which the film passes through a coater, a drying apparatus, and the like, wherein the loss of porous film occurs whenever rolls of the base porous film are replaced. Further, whenever the rolls are replaced with new rolls during a process of winding the base porous film, and a process of re-winding the composite porous film, a predetermined length at an early stage is not capable of being wound as a normal product due to wrinkles, and the like, which causes loss. In the present disclosure, the manufacturing process of the base porous film and the coating process may be continuously performed to minimize loss as described above.

Hereinabove, although the present disclosure is described by specific matters, limited exemplary embodiments, and drawings, they are provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the above-described exemplary embodiments, and the following claims as well as all modified equally or equivalently to the claims are intended to fall within the scopes and spirits of the disclosure.

TABLE 1

| | Thickness (μm) | Puncture Strength (N/μm) | Permeability (Darcy × $10^{-5}$) | 150° C., 1 hr Shrinkage (%) Machine Direction (MD) | 150° C., 1 hr Shrinkage (%) Transverse Direction (TD) | Production amount of base porous film (m²/hr) | Production amount of composite porous film (m²/hr) | Productivity (%) |
|---|---|---|---|---|---|---|---|---|
| Example 1 | 17 | 0.21 | 4.5 | <5 | <5 | 300 | 230 | 76.7 |
| Example 2 | 21 | 0.28 | 3.0 | <5 | <5 | 300 | 230 | 76.7 |
| Comparative Example 1 | 19 | 0.15 | 2.6 | <5 | <5 | 150 | 89 | 59.3 |
| Comparative Example 2 | 21 | 0.26 | 2.7 | <5 | <5 | 300 | 192 | 64.0 |

What is claimed is:

1. A manufacturing method of a polyolefin-based multi-layer composite porous film as a battery separator, comprising:
   a) forming a composition including a polyolefin resin and diluent into a sheet;
   b) stretching the sheet and extracting the diluent to manufacture a film;
   c) performing heat-treatment on the manufactured film; and
   d) coating one surface or both surfaces of the heat-treated film with a coating solution containing a heat resistant resin, inorganic particles, and latex particles in an emulsion form that includes an acrylate group in which a glass transition temperature Tg is −60° C. to 0° C.,
   wherein step c) and step d) are continuously performed.

2. The manufacturing method of claim 1, wherein the heat-treatment in step c) includes heat-setting process, and includes a heat-stretching process or a heat-relaxing process of the film in at least one direction.

3. The manufacturing method of claim 2, wherein in the heat-relaxing process, a width of the film after the heat-relaxing process is reduced by a ratio of 50 to 99% as compared to a width of the film before the heat-relaxing process.

4. The manufacturing method of claim 2, wherein in step b), a stretching ratio is four times or more in a machine direction and a transverse direction, respectively, and a total stretching ratio is 20 to 80 times, and
   in step c), a heat stretching ratio is 1.01 to 2.0 times in a machine direction or a transverse direction.

5. The manufacturing method of claim 1, wherein the composition of step a) includes 15 to 50 wt % of the polyolefin resin and 85 to 50 wt % of the diluent.

6. The manufacturing method of claim 1, wherein the polyolefin resin of step a) has a weight average molecular weight of $1 \times 10^5 \sim 2 \times 10^6$ g/mol.

7. The manufacturing method of claim 1, further comprising:
   e) drying the film coated in step d),
   wherein the drying is performed by using air or an infrared drying device.

8. The manufacturing method of claim 1, wherein the stretching process of step b) is performed within a range between a temperature lower than a melting point of the polyolefin resin by 40° C. and the melting temperature of the polyolefin resin, and
   the heat-treatment process of step c) is performed within a range between a temperature lower than the melting point of the polyolefin resin by 30° C. and a temperature higher than the melting point of the polyolefin resin by 10° C.

9. The manufacturing method of claim 1, wherein the heat resistant resin in step d) includes a water-soluble polymer or a water-insoluble polymer in which a melting temperature or a glass transition temperature is 150° C. or more.

10. The manufacturing method of claim 9, wherein the water-soluble polymer is at least any one selected from the group consisting of polyvinyl alcohol, polyacrylamide, polyvinylpyrrolidone, carboxyl methyl cellulose, hydroxyethyl cellulose, maleic anhydride-based resin, dextrin and mixtures thereof, and
   the water-insoluble polymer is a mixture including any one or two or more selected from polypolyphenylene sulfone, polysulfone, polyimide, polyamideimide, polyarylamide, polyarylate, polycarbonate, polyvinylidene fluoride, and copolymers thereof, or includes an acrylate group in which a glass transition temperature is −60° C. to 0° C.

* * * * *